United States Patent
Thompson et al.

(10) Patent No.: US 9,339,749 B2
(45) Date of Patent: May 17, 2016

(54) CYCLONIC SEPARATOR HAVING A SHROUD

(71) Applicant: Dyson Technology Limited, Wiltshire (GB)

(72) Inventors: Daniel John Thompson, Bristol (GB); James Stuart Robertson, Bath (GB); Sophie Kathryn Randles, Bristol (GB)

(73) Assignee: Dyson Technology Limited, Malmesbury, Wiltshire (GB)

(*) Notice: Subject to any disclaimer, the term of this patent is extended or adjusted under 35 U.S.C. 154(b) by 0 days.

(21) Appl. No.: 14/519,554

(22) Filed: Oct. 21, 2014

(65) Prior Publication Data

US 2015/0107048 A1    Apr. 23, 2015

(30) Foreign Application Priority Data

Oct. 21, 2013    (GB) .................................. 1318596.2

(51) Int. Cl.
*A47L 9/16*    (2006.01)
*B01D 45/16*    (2006.01)

(52) U.S. Cl.
CPC .............. *B01D 45/16* (2013.01); *A47L 9/1608* (2013.01); *A47L 9/1666* (2013.01)

(58) Field of Classification Search
CPC ..... A47L 9/1608; A47L 9/1666; B01D 45/16
USPC ........................................................... 15/353
IPC ........................................................ A47L 9/16
See application file for complete search history.

(56) References Cited

U.S. PATENT DOCUMENTS

| 3,597,902 A | 8/1971 | Williams |
| 2012/0073078 A1 | 3/2012 | Quance et al. |

FOREIGN PATENT DOCUMENTS

| CN | 202288134 | 7/2012 |
| JP | 3-297035 | 12/1991 |
| JP | 4-44853 | 4/1992 |
| JP | 6-37807 | 10/1994 |
| JP | 2000-48741 | 2/2000 |
| JP | 2002-45318 | 2/2002 |
| JP | 2007-117465 | 5/2007 |
| JP | 2008-43792 | 2/2008 |
| JP | 2012-66081 | 4/2012 |
| JP | 2012-115444 | 6/2012 |
| JP | 2013-146318 | 8/2013 |
| WO | WO-2013/031326 | 3/2013 |

OTHER PUBLICATIONS

Search Report dated Jan. 30, 2014, directed to GB Application No. 1318596.2; 1 page.

*Primary Examiner* — David Redding
(74) *Attorney, Agent, or Firm* — Morrison & Foerster LLP

(57) ABSTRACT

A cyclonic separator having an outer wall and an inner wall, and a shroud disposed between the outer wall and the inner wall, the inner wall having one or more outwardly projecting members, the shroud having upper and lower portions, and a mesh secured between the upper and lower portions, the lower portion having a flange that extends radially inward towards the inner wall, wherein the flange has one or more flexible portions, and the outwardly projecting members abut the flexible portions so as to bias the lower portion away from the upper portion to thus tension the mesh.

18 Claims, 8 Drawing Sheets

CYCLONIC SEPARATOR HAVING A SHROUD

REFERENCE TO RELATED APPLICATION

This application claims priority of United Kingdom Application No. 1318596.2 filed Oct. 21, 2013, the entire contents of which are incorporated herein by reference.

FIELD OF THE INVENTION

The present invention relates to a cyclonic separator having a shroud.

BACKGROUND OF THE INVENTION

Vacuum cleaners having cyclonic separators are now well known. The cyclonic separators typically comprise a cyclone chamber defined between an outer wall and a shroud. In general, an airflow in which dirt and dust is entrained enters the cyclone chamber via an inlet which causes the airflow to follow a spiral or helical path so that the dirt and dust is separated from the airflow. Relatively clean air then passes out of the cyclone chamber through the shroud and typically will then proceed to one or more subsequent cyclonic separators. The shroud can comprise a rigid wall provided with a large number of through-holes through which the air can travel. However, a recent trend has been to use a mesh secured between an upper and lower portion of the shroud. By using mesh, a greater open area is provided where air can pass through. However, it can be difficult to keep the mesh tensioned. If the mesh is not tensioned properly then it can potentially interfere with and disturb the spiralling airflow in the cyclone chamber. Additionally, if not properly tensioned, the mesh can look unsightly to a user.

One known scheme for creating tension in the mesh is shown in FIGS. 1a to 1c. A part of a shroud 1 is shown comprising a mesh 2 and a lower portion 3 to which the mesh 2 is attached. The lower portion 3 comprises an inner flange that extends towards an inner wall located behind the shroud. This flange usually acts as a seal between the lower portion 3 and the inner wall. A fin 4 located on the inner wall is provided at its lower end with two elastically deformable arms 5. As the shroud 1 is put into position during assembly, shown by arrow M, the arms 5 come into contact with the flange of the lower portion 3 of the shroud. The arms 5 are able to deform upwards as shown by the arrows A in FIG. 1a. Being elastically deformable, the arms 5 then provide a downward force F (shown in FIG. 1b) on the lower portion 3 of the shroud. This downward force F biases the lower portion 3 away from an upper portion (not shown) to which the top of the mesh 2 is attached and therefore tensions the mesh 2. Whilst this solution does work to tension the mesh 2, it has been found that the deformable arms 2 can sometimes be deformed past their yield point during assembly such that they no longer provide a downward force to the lower portion 3 of the shroud. Without the downward force F, the mesh 2 will no longer be tensioned. Furthermore, it has been found that the arms 5 of each fin 4 can create a pocket that can collect dirt 6, as shown in FIG. 1c. This can be avoided by upwardly extending the lower portion 3 of the shroud 1 such that the arms 5 are not visible through the mesh 2. However, this then reduces the mesh area, and therefore decreases the open area available for air to exit the cyclone chamber.

SUMMARY OF THE INVENTION

This invention provides a cyclonic separator having an outer wall and an inner wall, and a shroud disposed between the outer wall and the inner wall, the inner wall comprising one or more outwardly projecting members, the shroud comprising upper and lower portions, and a mesh secured between the upper and lower portions, the lower portion comprising a flange that extends radially inward towards the inner wall, wherein the flange comprises one or more flexible portions, and the outwardly projecting members abut the flexible portions so as to bias the lower portion away from the upper portion to thus tension the mesh.

As a result, an improved solution for tensioning the mesh of a shroud is provided. Specifically, when assembled, the projecting member abuts the inner flange without forming any undesirable pockets that can collect dirt. In addition, the flexible portion that allows the mesh to be tensioned is provided on the shroud itself, rather than on the inner wall of the cyclonic separator. This then makes it easier to repair the cyclonic separator should the flexible portion no longer provide the required tension. In this instance, only the shroud will need to be replaced, rather than the entire inner wall. Furthermore, it may be easier to make the flexible portion more robust when part of the shroud (and therefore hidden from view) rather than the inner wall, such that it has a much higher yield point.

The flexible portions may comprise tabs formed between cuts in the flange. This provides a relatively easy method for forming the flexible portions within the flange.

A seal may be provided on the underneath of the flange. This will ensure that no air is able to leak through any gaps in the flange, particularly in the instance where tabs are formed between cuts in the flange. The seal may also help to ensure a good seal between the flange and the inner wall.

The outwardly projecting members may comprise fins extending longitudinally down the inner wall. Fins can act to stop the mesh collapsing in on the inner wall while the cyclonic separator is in use due to the force of the air passing through the mesh. Fins also act to help to straighten and direct the airflow towards a next stage in the cyclonic separator.

The cyclonic separator may comprise at least three outwardly projecting members and flexible portions positioned equally around the circumference of the inner wall and the flange respectively. This will assist on providing an equal tension the entire way round the mesh.

The mesh may be overmoulded to both the upper and lower portions. This provides a simple but effective method for securing the mesh to both the upper and lower portions of the shroud.

This invention further provides a vacuum cleaner comprising a cyclonic separator as described in any one of the preceding paragraphs.

BRIEF DESCRIPTION OF THE DRAWINGS

In order that the present invention may be more readily understood, embodiments of the invention will now be described, by way of example, with reference to the accompanying drawings, in which.

DETAILED DESCRIPTION OF THE INVENTION

Figure 1C:
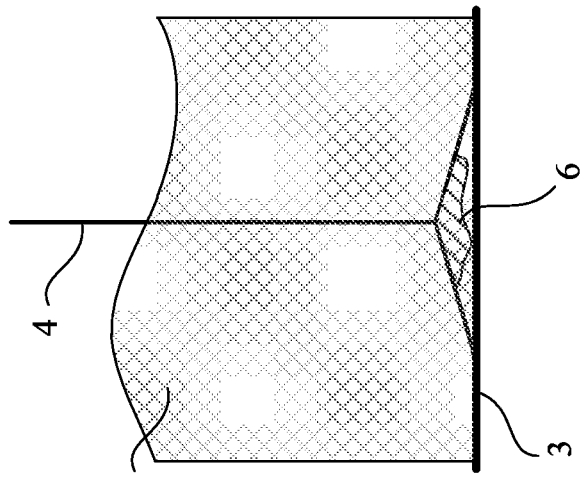
FIGS. 1a, b and c show a known mesh tensioning scheme.
Figure 1B:
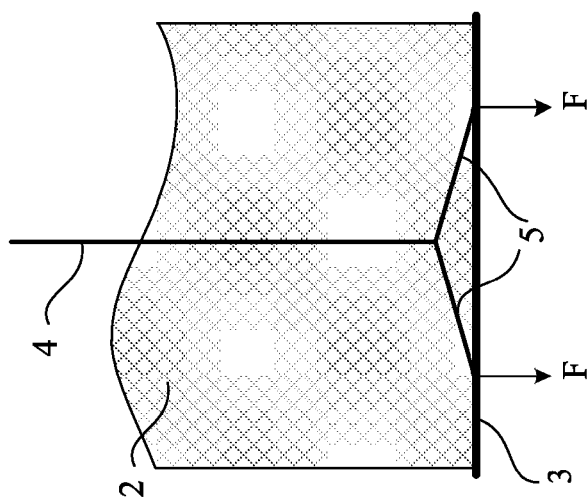
Figure 1A:
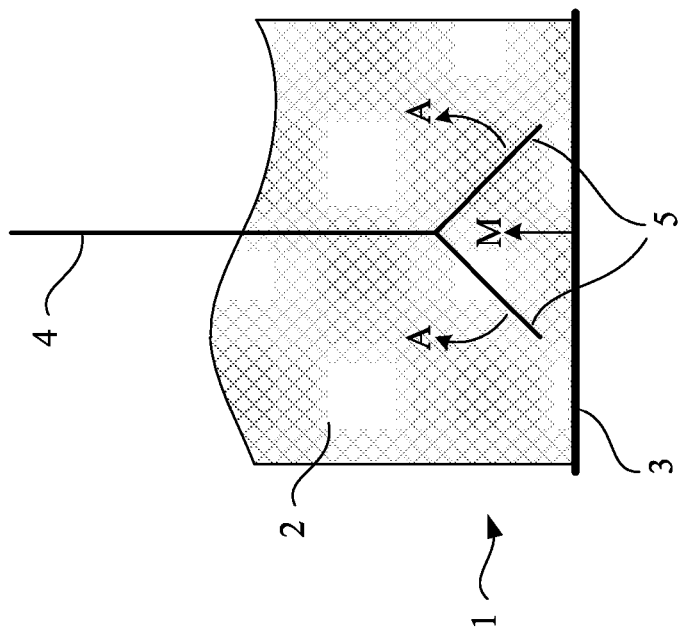
Figure 2:
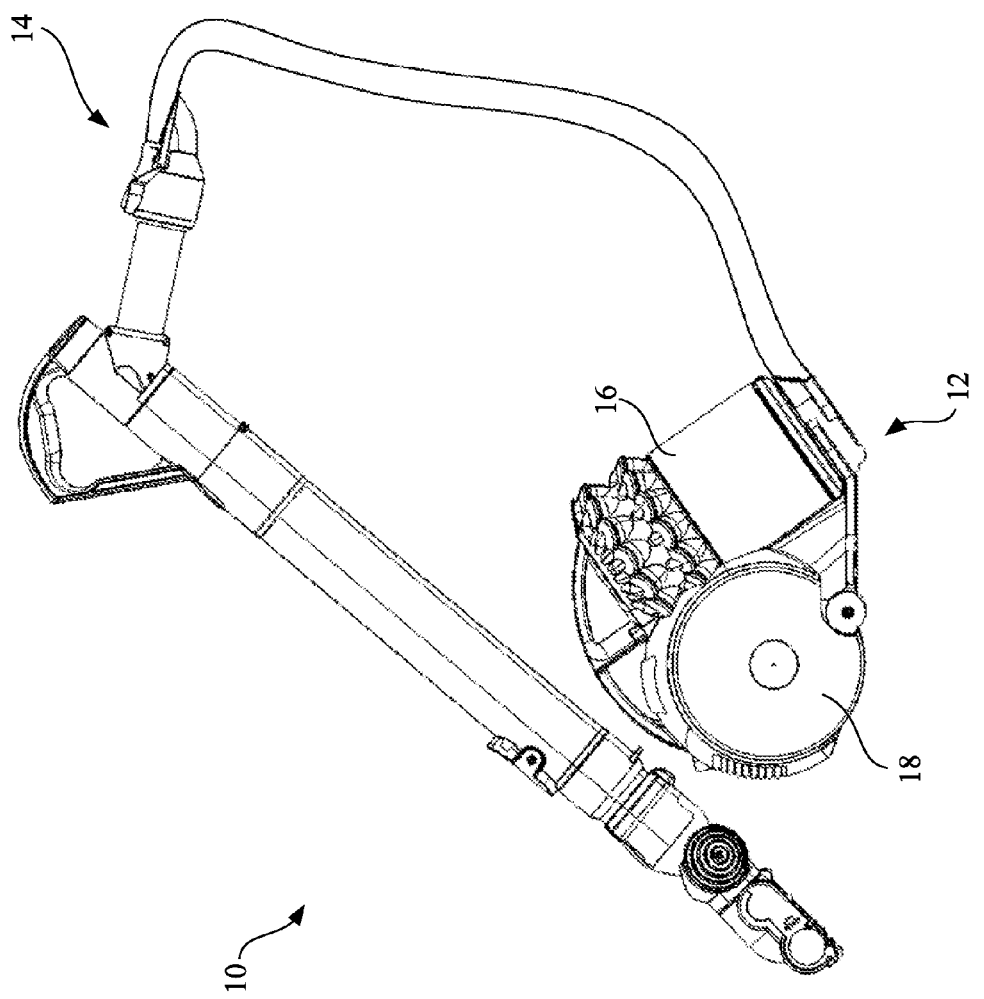
FIG. 2 is a cylinder vacuum cleaner.

FIG. 2 illustrates an external view of a cleaning appliance in the form of a vacuum cleaner 10. The vacuum cleaner 10 is of the cylinder or canister type which typically has a body 12 which is pulled behind a hose and wand assembly 14 during use. Although FIG. 2 shows a cylinder type vacuum cleaner, the presently claimed invention can be used within any style of vacuum cleaner that comprises a cyclonic separator, other examples of which may be upright or handheld vacuum cleaners.

The body 12 comprises a cyclonic separator 16 for separating dirt and dust from an airflow, and a floor engaging rolling assembly 18. The cyclonic separator 16 is received within the floor engaging rolling assembly 18 such that it is at least partially nested or docked within the rolling assembly 18. Dirty air enters the body 12 from the hose and wand assembly 14 via an inlet duct, and into the cyclonic separator 16. The cyclonic separator 16 is removable from the rolling assembly 18 such that any dirt collected by the cyclonic separator 16 may be emptied.

Figure 3:
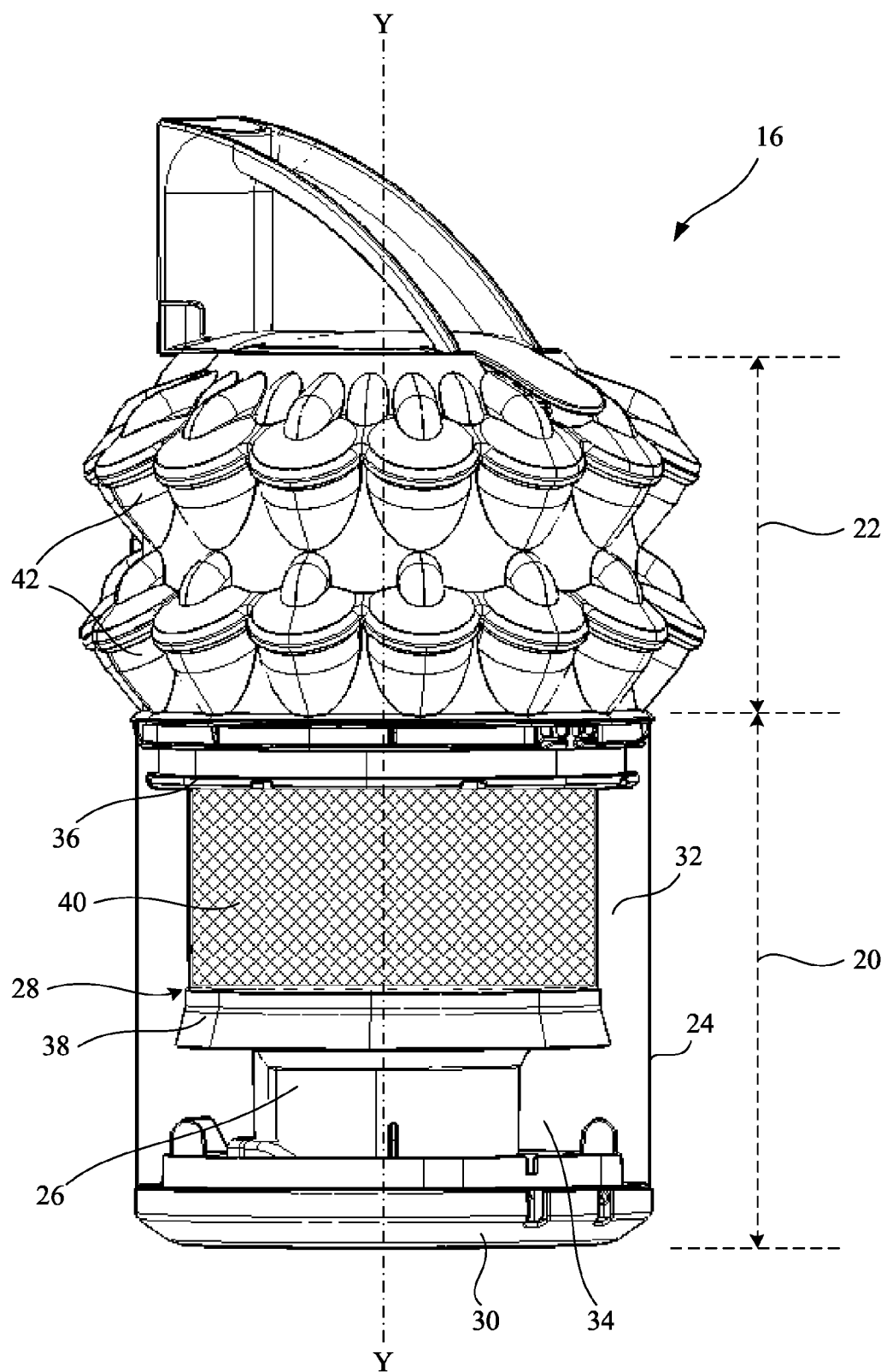
FIG. 3 is a cyclonic separator for a vacuum cleaner.

FIG. 3 shows the cyclonic separator 16. The cyclonic separator 16 comprises a first cyclone stage 20 and a second cyclone stage 22 located downstream of the first cyclone stage 20. The first cyclone stage 20 is intended to remove relatively large dirt and debris, and the second cyclone stage 22 is intended to remove finer dirt that is able to pass through the first cyclone stage 20.

The first cyclone stage 20 comprises an outer wall 24, an inner wall 26, a shroud 28 and a base 30, which collectively define a cyclone chamber 32 and a first dirt collection chamber 34. The shroud 28 comprises an upper portion 36, a lower portion 38, and a mesh 40. The mesh 40 is secured between the upper and lower portions 36,38, for example it may be overmoulded to each of them. Fluid exits the cyclone chamber 32 through the mesh 40 and is then directed towards the second cyclone stage 22. An inlet to the cyclone chamber 32 is provided in the outer wall 24. The inlet is arranged so as to introduce air into the cyclone chamber 32 in a substantially tangential direction in order to encourage the air to flow in a spiral or helical manner around the cyclone chamber 32.

The second cyclone stage 22 comprises a plurality of cyclone bodies 42 arranged about a longitudinal axis of the cyclonic separator 16, shown as dotted line Y-Y in FIG. 3, and a second dirt collection chamber. The second cyclone stage 22 illustrated in the figures comprises of two layers of cyclone bodies 42. However, other alternative embodiments may contain just one or more than two layers of cyclone bodies 42.

Although only a lower section of the inner wall 26 is visible in FIG. 3, it extends beneath the shroud 28 and joins to the base of the cyclone bodies 42 at the top of the first cyclone stage 20. The inner wall 26 defines an inner cavity that is the second dirt collection chamber. The finer dirt captured by the second cyclone stage is collected in the second dirt collection chamber. Both the first and second dirt collection chambers are closed at the lower end by the base 30. The base 30 can be opened to allow both the first and second dirt collection chambers to be emptied. For example, the base 30 may be pivotably attached to the outer wall 24 by a hinge and can be held in a closed position by a catch which engages a lip located on the outer wall 24.

Figure 4:
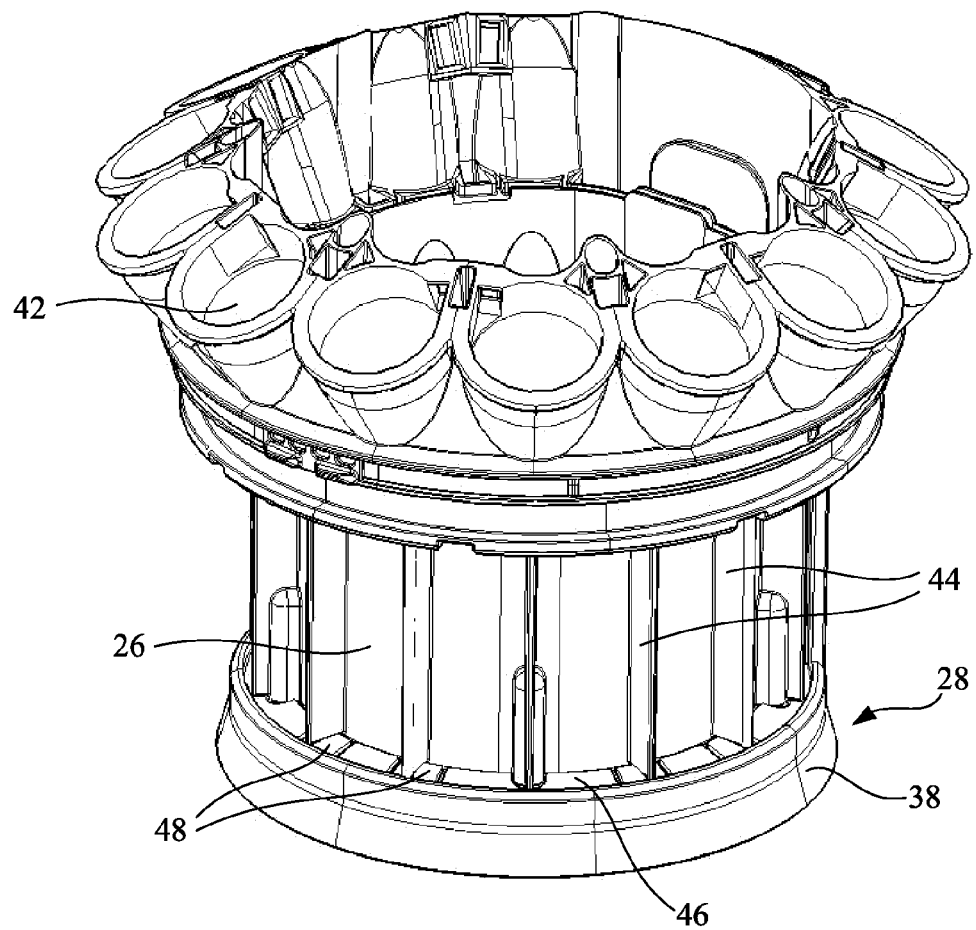
FIG. 4 is a part from a cyclonic separator including a shroud in accordance with the present invention.
Figure 5:
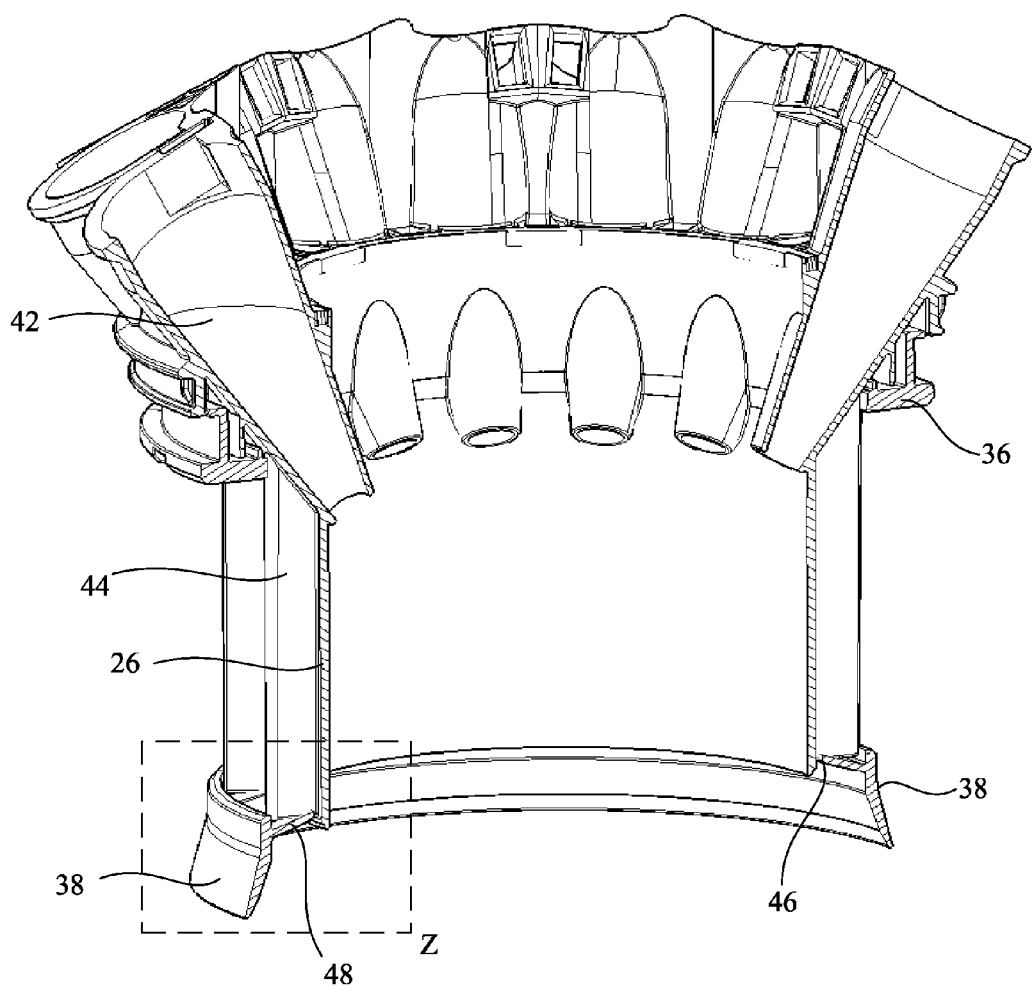
FIG. 5 is a cross-section through the part shown in FIG. 4.
Figure 6:
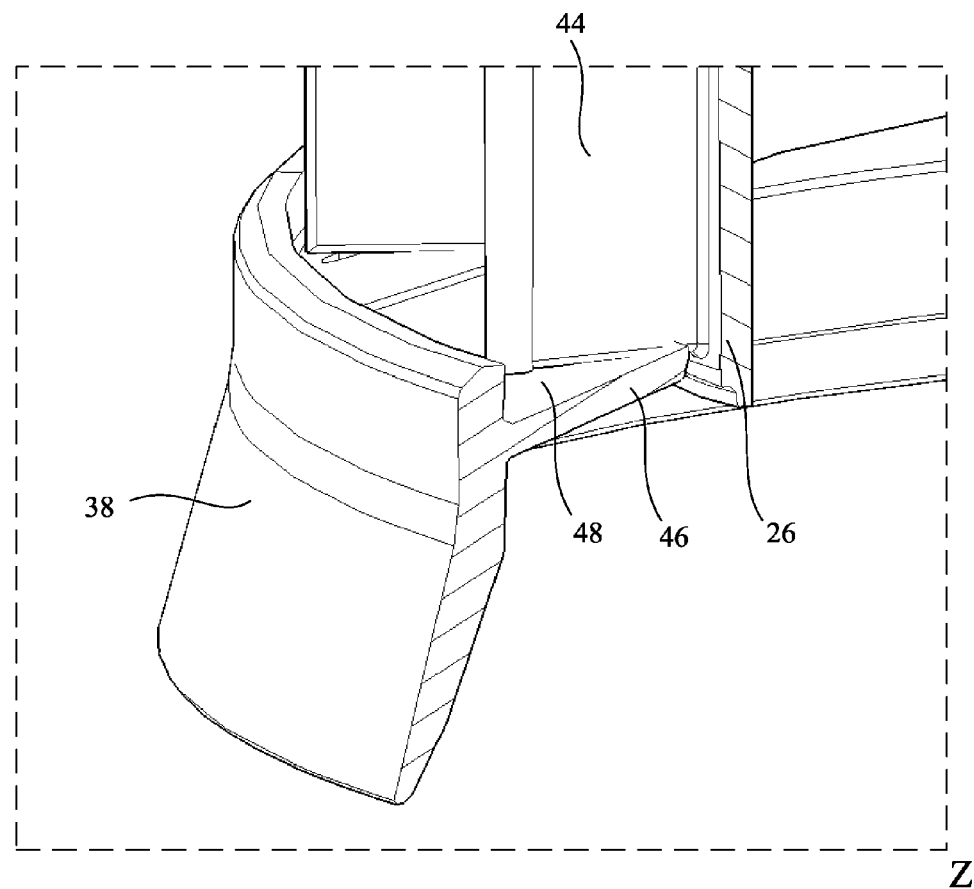
FIG. 6 shows a magnified section of the cross-section of FIG. 4, the section being indicated by the dashed rectangle Z.

FIGS. 4 and 5 show part of the cyclonic separator of FIG. 3 comprising the lower layer of cyclone bodies 42, the inner wall 26, and the shroud 28. The mesh 40 of the shroud has been removed from view to allow the features of the inner wall 26 beneath the shroud to be seen. The inner wall 26 comprises outwardly projecting members in the form of fins 44 that extend axially down the inner wall 26 such that the bottom end of the fins 44 abut the flange 46 of the shroud 28. The fins 44 extend radially outwards from the inner wall 26 so as to extend at least partway of the distance between the inner wall 26 and the mesh 40. The fins 44 act to stop the mesh 40 collapsing in on the inner wall 26 while the cyclonic separator 16 is in use due to the force of the air passing through the mesh 40. The fins 44 also act to help to straighten and direct the airflow towards the second cyclone stage 22 by assisting in changing the direction of the air from a generally helical path around the Y-Y axis to a direction that is approximately parallel to the Y-Y axis. The bottom ends of these fins 44 come into abutment with the inner flange 46 provided on the lower portion 38 of the shroud 28. This inner flange 46 comprises flexible portions, shown in the figures as tabs 48 formed between cuts in the flange 46 that are positioned around the flange 46 so as to circumferentially align with the position of the fins 44 on the inner wall 26. Of course, it will be understood that the tabs 48 may be formed within the flange by alternative methods that do not require the flange to be cut.

During assembly, the shroud 28 is positioned by sliding it over the bottom of the inner wall 26 and then attaching the top portion 36 to the base of the cyclonic bodies 42. The length of the fins is such that when the top portion 36 of the shroud 28 approaches the base of the cyclone bodies 42, the bottom edges of the fins 44 come into abutment with the tabs 48 of the inner flange 46. Then, as the top portion 36 of the shroud is brought into contact with the base of the cyclone bodies 42 and fixed in place, the fins 44 press downwards on the flange 46, thus biasing the lower portion 38 away from the upper portion 36, resulting in the mesh 40 being tensioned.

Figure 7B:
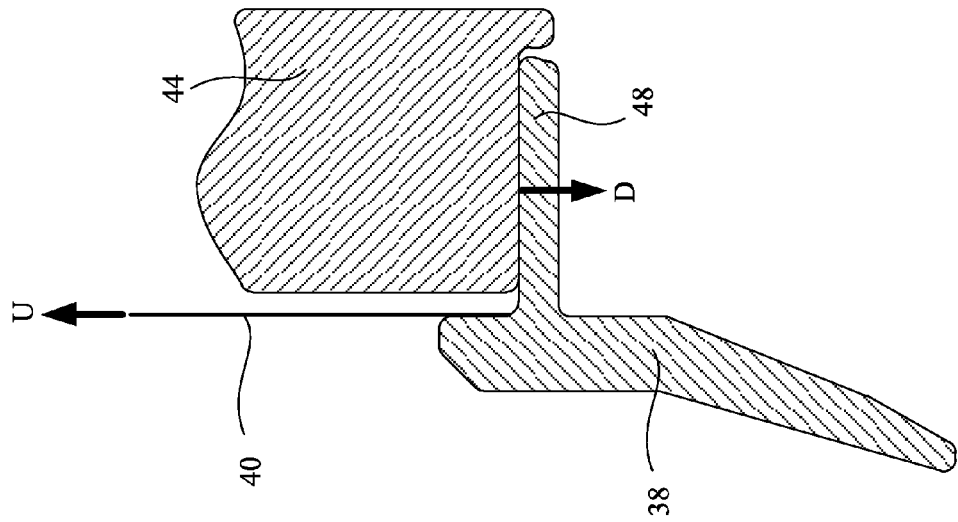
FIGS. 7a and 7b are schematic diagrams of the mesh tensioning system in accordance with the present invention.
Figure 7A:
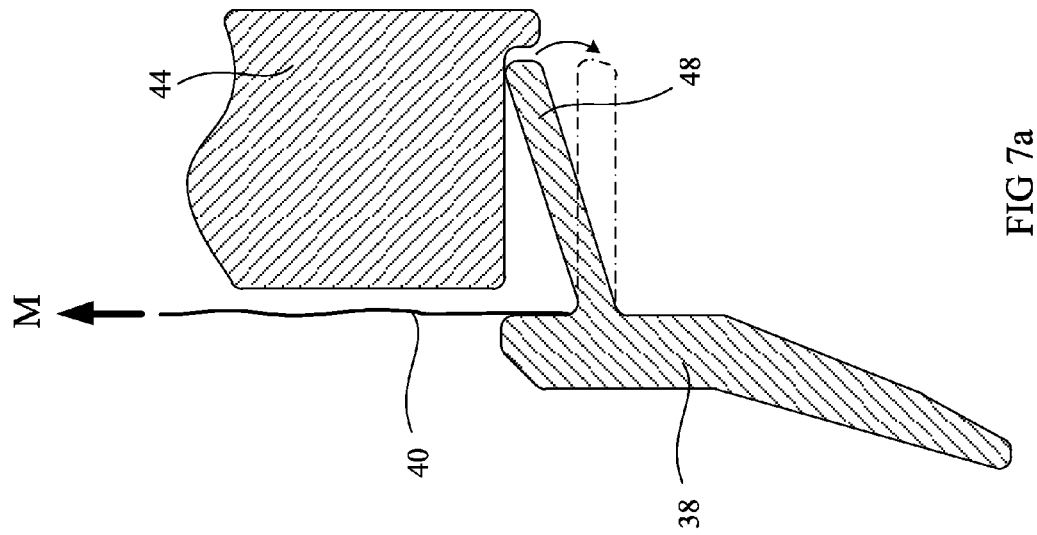

FIGS. 7*a* and 7*b* schematically show how a fin 44 acts on a tab 48 of the inner flange 46 in order to tension the mesh 40 during assembly. Before the shroud is fixed in position, the mesh 40 is not under tension. Then as the shroud is moved upwards towards the second cyclone stage in the direction of arrow M, the fin 44 makes contact with the tab 48 which is able to elastically deform and flex downwards when subjected to a downwards force applied to it by the fin 44. The position of the tab 48 after flexing downwards is shown by the dotted line in FIG. 7*a*. As the tab 48 is elastically deformable, it will provide an upwards force against the fin 44, biasing the lower portion of the shroud away from the upper portion of the shroud and thus placing the mesh 40 under tension. The ability of the tab 48 to deform elastically allows for some flexibility during assembly of the cyclonic separator 16 so as to accommodate for tolerances in the shroud length, fin length etc. Accordingly, the mesh 40 is not over-tensioned when fixed in place.

Figure 8:
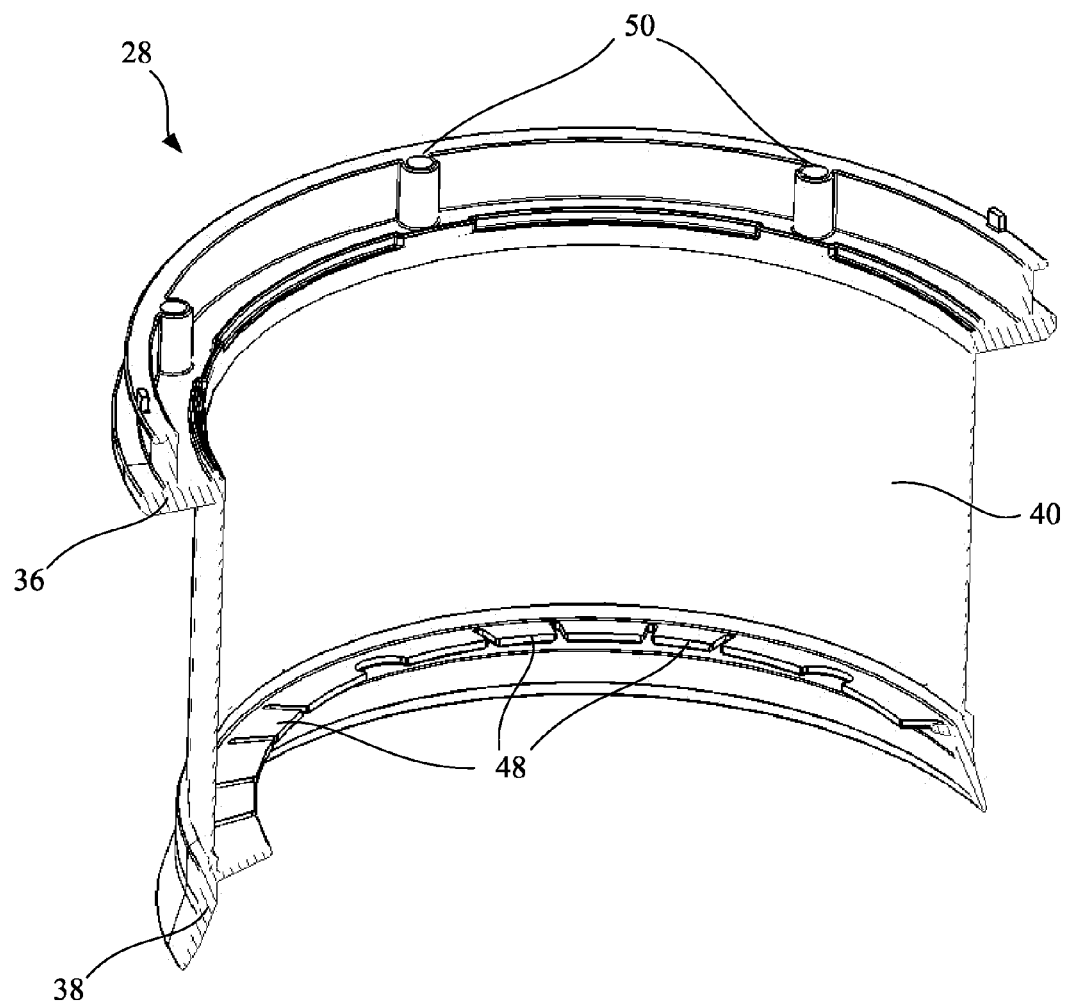
FIG. 8 is a cross-section through a shroud in accordance with the present invention.

FIG. 8 shows a cross section through the shroud. From this figure it can clearly be seen that a plurality of tabs 48 are provided around the whole flange. The tabs 48 are uniformly spaced around the circumference of the inner flange. A plurality of fins are then spaced uniformly around the inner wall. As a result, a uniform tension around the whole mesh 40 is achieved.

A seal (not shown) may be provided on the underside of the inner flange such that no air is able to leak through gaps between the tabs 48 where the flange 46 has been cut to form the tabs 48. The seal may also help to provide a good seal between the flange 46 and the inner wall 26. Alternatively, in an alternative embodiment, the flexible portions provided in the flange 46 may comprise sections of an elastic material that can stretch such that the portion is still able to flex downwards, but without creating a gap in the flange 46 through which air could leak. Other suitable alternatives for the flexible portions that are within the scope of the claims will be apparent to a person of skill in the art.

The additional benefits provided by the use of fins 44 have already been discussed. However, whilst all the embodiments described herein comprise fins 44, it will be understood by a person of skill in the art that other forms of outwardly projecting members could be provided on the inner wall that can engage with the inner flange of the shroud. For example, the outwardly projecting member may be in the form of one or more bosses projecting out from the inner wall towards the shroud.

Whilst particular embodiments have thus far been described, it will be understood that various modifications may be made without departing from the scope of the invention as defined by the claims.

The invention claimed is:

1. A cyclonic separator comprising an outer wall and an inner wall, and a shroud disposed between the outer wall and the inner wall, the inner wall comprising one or more outwardly projecting members, the shroud comprising upper and lower portions, and a mesh secured between the upper and lower portions, the lower portion comprising a flange that extends radially inward towards the inner wall, wherein the flange comprises one or more flexible portions, and the outwardly projecting members abut the flexible portions so as to bias the lower portion away from the upper portion to thus tension the mesh.

2. The cyclonic separator of claim 1, wherein the flexible portions comprise tabs formed between cuts in the flange.

3. The cyclonic separator of claim 2, wherein a seal is provided on the underneath of the flange.

4. The cyclonic separator of claim 1, wherein the outwardly projecting members comprise fins extending longitudinally down the inner wall.

5. The cyclonic separator of claim 1, wherein the cyclonic separator comprises at least three outwardly projecting members and flexible portions positioned equally around the circumference of the inner wall and the flange respectively.

6. The cyclonic separator of claim 1, wherein the mesh is overmoulded to both the upper and lower portions.

7. A vacuum cleaner comprising a cyclonic separator as claimed in claim 1.

8. A cyclonic separator comprising an outer wall and an inner wall, and a shroud disposed between the outer wall and the inner wall, the inner wall comprising one or more outwardly projecting members, the shroud comprising upper and lower portions, and a mesh secured between the upper and lower portions, the lower portion comprising a flange that extends radially inward towards the inner wall, wherein a seal is provided on the underneath of the flange and the flange comprises one or more flexible portions, wherein the flexible portions comprise tabs formed between cuts in the flange, and wherein the outwardly projecting members abut the flexible portions so as to bias the lower portion away from the upper portion to thus tension the mesh.

9. The cyclonic separator of claim 8, wherein the outwardly projecting members comprise fins extending longitudinally down the inner wall.

10. The cyclonic separator of claim 8, wherein the cyclonic separator comprises at least three outwardly projecting members and flexible portions positioned equally around the circumference of the inner wall and the flange respectively.

11. The cyclonic separator of claim 8, wherein the mesh is overmoulded to both the upper and lower portions.

12. A vacuum cleaner comprising a cyclonic separator as claimed in claim 8.

13. A cyclonic separator comprising an outer wall and an inner wall, and a shroud disposed between the outer wall and the inner wall, the inner wall comprising one or more outwardly projecting members, the shroud comprising upper and lower portions, and a mesh secured between the upper and lower portions, the lower portion comprising a flange that extends radially inward towards the inner wall, wherein the flange comprises one or more flexible portions, wherein the outwardly projecting members comprise fins extending longitudinally down the inner wall that abut the flexible portions so as to bias the lower portion away from the upper portion to thus tension the mesh.

14. The cyclonic separator of claim 13, wherein the flexible portions comprise tabs formed between cuts in the flange.

15. The cyclonic separator of claim 14, wherein a seal is provided on the underneath of the flange.

16. The cyclonic separator of claim 13, wherein the mesh is overmoulded to both the upper and lower portions.

17. The cyclonic separator of claim 13, wherein the cyclonic separator comprises at least three outwardly projecting members and flexible portions positioned equally around the circumference of the inner wall and the flange respectively.

18. A vacuum cleaner comprising a cyclonic separator as claimed in claim 13.

* * * * *